(12) United States Patent
Ye et al.

(10) Patent No.: US 12,291,079 B2
(45) Date of Patent: May 6, 2025

(54) CONNECTION APPARATUS, MANUFACTURING METHOD FOR CONNECTION DEVICE, AND THERMAL MANAGEMENT COMPONENT

(71) Applicant: ZHEJIANG SANHUA AUTOMOTIVE COMPONENTS CO., LTD., Zhejiang (CN)

(72) Inventors: Keli Ye, Zhejiang (CN); Linzhong Wu, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 78 days.

(21) Appl. No.: 18/268,231

(22) PCT Filed: Dec. 22, 2021

(86) PCT No.: PCT/CN2021/140436
§ 371 (c)(1),
(2) Date: Jun. 18, 2023

(87) PCT Pub. No.: WO2022/135465
PCT Pub. Date: Jun. 30, 2022

(65) Prior Publication Data
US 2024/0262160 A1    Aug. 8, 2024

(30) Foreign Application Priority Data

Dec. 23, 2020  (CN) .......................... 202011539509.5

(51) Int. Cl.
*B60H 1/00* (2006.01)
*B60H 1/32* (2006.01)
*F28F 9/18* (2006.01)

(52) U.S. Cl.
CPC ....... *B60H 1/00485* (2013.01); *B60H 1/3229* (2013.01); *F28F 9/18* (2013.01)

(58) Field of Classification Search
CPC ...... B60H 1/00485; B60H 1/3229; F28F 9/18
See application file for complete search history.

(56) References Cited

U.S. PATENT DOCUMENTS

2014/0376178 A1* 12/2014 Moore ....................... G06F 1/20
                                                                165/185
2016/0340061 A1* 11/2016 Bose ................... H05K 7/20254
(Continued)

FOREIGN PATENT DOCUMENTS

| CN | 104832683 A | 8/2015 |
|----|-------------|--------|
| CN | 110056681 A | 7/2019 |

(Continued)

OTHER PUBLICATIONS

International Search Report for PCT/CN2021/140436 mailed Mar. 21, 2022, ISA/CN.

*Primary Examiner* — Kevin R Barss
(74) *Attorney, Agent, or Firm* — Yue (Robert) Xu; Apex Attorneys at Law, LLP

(57) ABSTRACT

A connection apparatus, a manufacturing method of the connection apparatus, and a thermal management component are provided. The connection apparatus includes two or more plate bodies; the adjacent plate bodies are fixed and connected in a sealed manner; the connection apparatus is provided with a channel; at least one channel part is arranged in at least one of the adjacent plate bodies; the adjacent plate bodies define a channel at the channel part. One of the side walls of at least one plate body is provided with a mounting portion and/or a connecting portion along the axial direction or radial direction of the connection apparatus; the mounting portion is internally provided with a mounting hole for (Continued)

communication with the channel; the connecting portion is provided with a connecting hole.

18 Claims, 11 Drawing Sheets

(56) References Cited

U.S. PATENT DOCUMENTS

| | | | | |
|---|---|---|---|---|
| 2017/0127561 | A1* | 5/2017 | You | H05K 7/20927 |
| 2019/0047373 | A1* | 2/2019 | Kim | B60H 1/00342 |
| 2019/0304630 | A1* | 10/2019 | Goergen | H04L 12/40045 |
| 2020/0276879 | A1* | 9/2020 | Kim | H01M 10/625 |
| 2024/0230184 | A1* | 7/2024 | Qiao | B60H 1/3228 |
| 2024/0410327 | A1* | 12/2024 | Fischer | F02K 9/62 |

FOREIGN PATENT DOCUMENTS

| | | |
|---|---|---|
| CN | 209892833 U | 1/2020 |
| CN | 111811153 A | 10/2020 |
| CN | 215063015 U | 12/2021 |
| JP | 2006313008 A | 11/2006 |

\* cited by examiner

CONNECTION APPARATUS, MANUFACTURING METHOD FOR CONNECTION DEVICE, AND THERMAL MANAGEMENT COMPONENT

This application is the national phase of International Application No. PCT/CN2021/140436, titled "CONNECTION APPARATUS, MANUFACTURING METHOD FOR CONNECTION DEVICE, AND THERMAL MANAGEMENT COMPONENT", filed on Dec. 22, 2021, which claims priority to Chinese Patent Application No. 202011539509.5, titled "COMMUNICATION DEVICE, MANUFACTURING METHOD FOR COMMUNICATION DEVICE, AND THERMAL MANAGEMENT ASSEMBLY", filed on Dec. 23, 2020 with the China National Intellectual Property Administration, the entire disclosures thereof are incorporated herein by reference.

FIELD

The present application relates to the technical field of vehicle thermal management, and in particular to a communication device, a method for manufacturing the communication device and a thermal management assembly.

BACKGROUND

A vehicle thermal management system includes components such as a heat exchanger, a valve device and a reservoir. Generally, the above components are connected to a system via a pipeline, or are integrally connected by mounting the above components at a communication portion. For a simple flow channel structure, the communication portion is generally formed by machine manufacturing, however, it is difficult to form complex spatial flow channels.

SUMMARY

It is an object of the present application to provide a communication device, a method for manufacturing a communication device and a thermal management assembly. The communication device can be used to form complex spatial channels, which can meet requirements of arrangement of different devices, reduce the positional limitation of the arrangement of devices, and has better applicability.

In order to achieve the above object, the following technical solutions are provided according to an embodiment of the present application.

A communication device is provided according to an embodiment of the present application. The communication device is applicable to a thermal management assembly, where the communication device includes two or more plate bodies, adjacent plate bodies of the plate bodies are secured to each other and connected in a sealed manner, the communication device is provided with a channel, at least part of at least one channel portion is arranged inside at least one of the adjacent plate bodies, and the channel is formed at the channel portion by the adjacent plate bodies, where in an axial direction or a radial direction of the communication device, one of side walls of at least one of the plate bodies is provided with a mounting portion and/or a communication portion, the mounting portion is provided with a mounting hole, the thermal management assembly includes a valve device capable of controlling a flow rate or blocking/unblocking of the channel, the mounting hole is configured to accommodate at least part of the valve device, the channel is in communication with the mounting hole of at least one of the mounting portion; the communication portion is provided with a communication hole; the thermal management assembly further comprises a thermal management unit, the communication hole is configured to be in communication with one of an inlet or an outlet of at least one of the thermal management unit, and the channel is in communication with at least one of the communication hole.

A thermal management assembly is further provided according to the present application. The thermal management assembly includes a communication device, a thermal management unit and a valve device. The thermal management unit includes at least one of a heat exchange portion and a reservoir, the valve device includes at least one of a throttling element, an electromagnetic valve and a switching valve; the communication device includes two or more plate bodies, adjacent plate bodies of the plate bodies are secured to each other and connected in a sealed manner; the communication device is provided with a channel, at least one channel portion is arranged inside at least one of the adjacent plate bodies, and the channel is formed at the channel portion by the adjacent plate bodies; where in an axial direction or a radial direction of the communication device, one of side walls of at least one of the plate bodies is provided with a mounting portion and/or a communication portion, the mounting portion is provided with a mounting hole, at least part of the valve device is arranged in the mounting hole, the communication portion is provided with a communication hole, and an inlet or an outlet of at least one of the thermal management unit is in communication with the communication hole.

A method for manufacturing the communication device is provided according to the present application. The method includes:

S1, providing two or more blank plates, where in the axial direction or the radial direction of the communication device, one of side walls of at least one of the blank plates is provided with the mounting portion and/or the communication portion, and processing a channel portion in at least one of adjacent blank plates to obtain the plate bodies having the channel portion;

S2, stacking the adjacent plate bodies in sequence, and securing the adjacent plate bodies to each other and connecting the adjacent plate bodies in a sealed manner, where part of a side wall of the channel is formed at the channel portion by the adjacent plate bodies; and S3, after connection in the sealed manner, processing the mounting hole in the mounting portion of the plate bodies and/or processing the communication hole in the communication portion.

The advantageous effects of the present application are as follows.

In the communication device according to the above technical solutions, the two or more plate bodies are provided, and the adjacent plate bodies are secured to each other and connected in a sealed manner, at least one channel portion is arranged inside at least one of the adjacent plate bodies, a channel is provided, where the channel is formed at the channel portion by the adjacent plate bodies, and the mounting portion and/or the communication portion is arranged at one of side walls of at least one of the plate bodies in the axial direction or radial direction of the communication device; the mounting portion is provided with the mounting hole, the channel is in communication with the mounting hole of the mounting portion; part of the valve device is arranged in the mounting hole; the communication portion is provided with a communication hole, the inlet or the outlet of at least one of the thermal management unit is in communication with the communication hole, and the valve device is mounted on the plate bodies via the mounting portion. In addition, the mounting portion is provided with the mounting hole to allow the channel to be in communication with the valve device through the mounting hole; the communication portion is provided with the communication hole, and the communication hole is in communication with the inlet or outlet of the thermal management unit. Two or more plate bodies are provided, the channel is formed at the channel portion by the adjacent plate bodies, the channel may be formed by multiple channel portions provided in a surrounding manner, which increases the internal space of the channel and can store more fluid medium; besides, a complex spatial channel can be formed in the communication device, which facilitates arrangement of the valve devices and the thermal management units in multiple thermal management assemblies, and can meet requirements of arrangement of different components, to reduce the positional limitation of the arrangement of the components, thereby improving the utilization of the internal space.

DETAILED DESCRIPTION OF THE EMBODIMENTS

Figure 1:
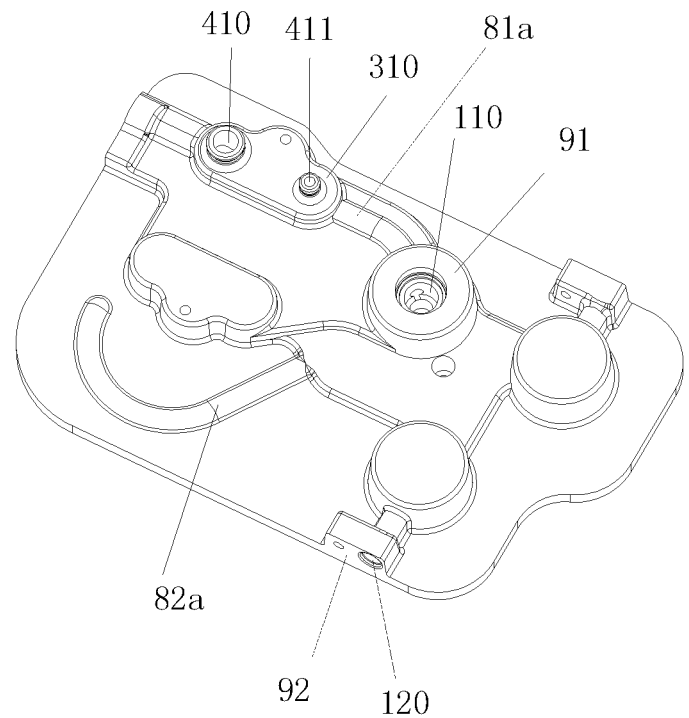
FIG. 1 is a three-dimensional schematic view showing the structure of a communication device from a viewpoint according to a first embodiment of the present application.

The present application will be described in detail below in conjunction with the accompanying drawings. It should be noted that the description of the present application below with reference to the accompanying drawings is only illustrating, rather than limiting. Various different embodiments may be mutually combined to form other embodiments not illustrated in the following description.

Referring to FIG. 1 to FIG. 22, a communication device is provided according to an embodiment of the present application. The communication device is applicable to a thermal management assembly. The communication device includes two or more plate bodies, adjacent plate bodies of the plate bodies are secured to each other and connected in a sealed manner, the communication device is provided with a channel, at least one channel portion is provided inside at least one of the adjacent plate bodies of the plate bodies, and the channel is formed at the channel portion by the adjacent plate bodies. In an axial direction or a radial direction of the communication device, one of side walls of at least one of the plate bodies is provided with a mounting portion and/or a communication portion, the mounting portion is provided with a mounting hole, the thermal management assembly includes a valve device capable of controlling a flow rate or blocking/unblocking of the channel, at least part of the valve device is arranged in the mounting hole, and the channel is in communication with the mounting hole of at least one of the mounting portion; the communication portion is provided with a communication hole, the thermal management assembly further includes a thermal management unit, one of an inlet or an outlet of at least one of the thermal management unit is communicable to the communication hole, and the channel is in communication with at least one of the communication hole. Herein, the radial direction refers to an extension direction of the surface the plate body, and the axial direction refers to a direction perpendicular to the extension direction of the plate body.

It should be noted that the mounting portion is used to mount the valve device to the plate bodies, the mounting portion is provided with the mounting hole, and the channel is in communication with the valve device through the mounting hole. The communication portion is provided with the communication hole, and the communication hole is in communication with one of the inlet and outlet of the thermal management unit. The fluid medium flows through the channel and corresponding components. As two or more plate bodies are provided, at least part of the channel is formed at the channel portion by the adjacent plate bodies, the channel may be formed by at least two channel portions provided in a surrounding manner, which increases the internal space of the channel and can store more fluid medium; besides, a complex spatial channel can be formed in the communication device, which facilitates arrangement of the valve devices and the thermal management units in multiple thermal management assemblies, and can meet different requirements of arrangement of different components, thus the arrangement of the components is not limited by the position, thereby improving the utilization of the internal space.

The above plate bodies may be made of a material such as aluminium alloy. Before the welding, at least one of the adjacent plate bodies may be coated with a composite welding layer on a joint surface, so that the plate body provided with the composite welding layer is secured to a plate body adjacent to the plate body by welding. Alternatively, a solder layer may be arranged between two adjacent plate bodies, and the adjacent plate bodies are secured by welding through the solder layer. The material of the solder layer may be referred to the conventional technology. Alternatively, a third plate sheet with a composite welding layer being coated on each of both sides is arranged between the adjacent plate bodies. The above fluid medium may be a refrigerant, a coolant or a cooling oil, or the like, which are used in a vehicle thermal management system.

One channel may be formed by multiple corresponding adjacent channel portions being connected in a surrounding manner, for example, for the one channel, part of a side wall of the channel may be formed by channel portions arranged in two plate bodies, three plate bodies, or four plate bodies. In addition, different channels in the communication device may include different and/or the same number of plate bodies. For example, the communication device includes five plate bodies, part of a side wall of one of the channels may be formed by a channel portion between two plate bodies, while part of a side wall of another one of the channels may be formed by channel portions arranged in three plate bodies.

In the axial direction or radial direction of the communication device, one of the side walls of at least one plate body is provided with a mounting portion and/or a communication portion, for example, in the axial direction of the communication device, a side wall of a plate body is provided with a mounting portion and a communication portion, the mounting portion is provided with a mounting hole, part of the valve device is arranged in the mounting hole, the channel is in communication with the mounting hole; the communication portion is provided with a communication hole, the inlet or the outlet of the thermal management unit is in communication with the communication hole, and the communication hole is in communication with the channel. Two side walls of two plate bodies are provided with two mounting portions, with each side wall being provided with a corresponding mounting portion, the mounting portion is provided with a mounting hole, and each mounting hole is correspondingly provided with part of the valve device.

The communication device according to the present application will be further described below in conjunction with specific embodiments.

Referring to FIG. 1 to FIG. 14, in a first embodiment of the present application, the communication device includes five plate bodies, from top to bottom, the five plate bodies are defined as a first plate body 1a, a second plate body 2a, a third plate body 3a, a fourth plate body 4a and a fifth plate body 5a. The second plate body 2a is arranged between the first plate body 1a and the third plate body 3a, the fourth plate body 4a is arranged between the third plate body 3a and the fifth plate body 5a, the channel portion of the second plate body 2a and the channel portion of the fourth plate body 4a each is a through groove 7a. The channel portion of the first plate body 1a and the channel portion of the fifth plate body 5a each is a sunken groove 6a. The third plate body 3a includes two channel portions, each of the two channel portions of the third plate body 3a is a sunken groove 6a, one of the sunken grooves 6a of the third plate body 3a is defined as a first sunken groove 61a and the other is defined as a second sunken groove 62a. The channel 8 includes a first channel 81a and a second channel 82a, the first channel 81a is formed by the sunken groove 6a of the first plate body 1a, the through groove 7a of the second plate body 2a and the first sunken groove 61a of the third plate body 3a, and the second channel 82a is formed by the second sunken groove 62a of the third plate body 3a, the through groove 7a of the fourth plate body 4a and the sunken groove 6a of the fifth plate body 5a. A joint surface of the second plate body 2a with the first plate body 1a and a joint surface of the second plate body 2a with the third plate body 3a each is coated with a composite welding layer, and a joint surface of the fourth plate body 4a with the third plate body 3a and a joint surface of the fourth plate body 4a with the fifth plate body 5a each is coated with a composite welding layer. In other embodiments, the second plate body 2a may be partially arranged between the first plate body 1a and the third plate body 3a, and the fourth plate body 4a may be partially arranged between the third plate body 3a and the fifth plate body 5a.

Figure 7:
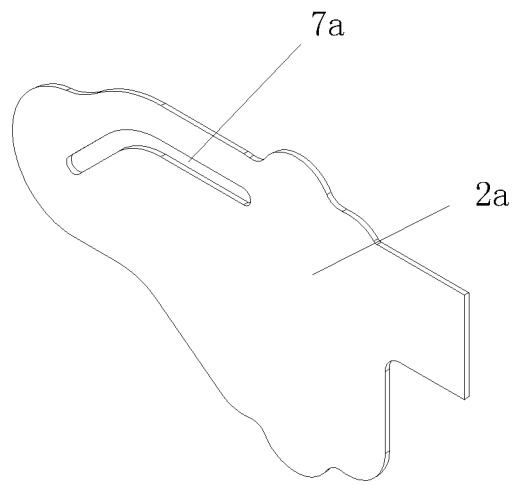
FIG. 7 is a three-dimensional schematic view showing the structure of a second plate body obtained by step S1 in a method for manufacturing the communication device in FIG. 1.

It should be noted that in the embodiment, the first channel 81a is formed by the sunken groove 6a of the first plate body 1a, the through groove 7a of the second plate body 2a and the first sunken groove 61a of the third plate body 3a. As shown in FIGS. 1 and 7, the through groove 7a of the second plate body 2a has a shape the same as that of the first channel 81a, the number of the first channel 81 is one, and the first channel 81a is arc-shaped.

Figure 2:
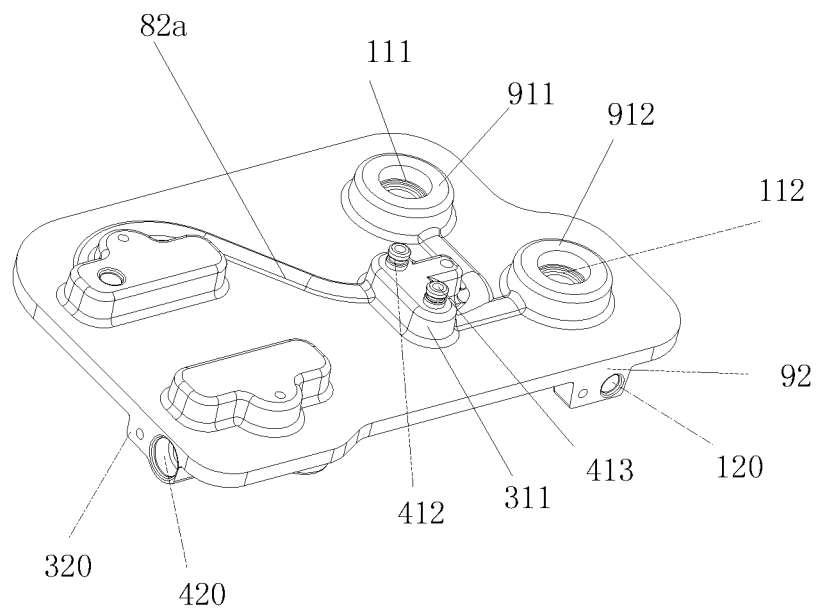
FIG. 2 is a three-dimensional schematic view showing the structure of the communication device shown in FIG. 1 from another viewpoint.
Figure 3:
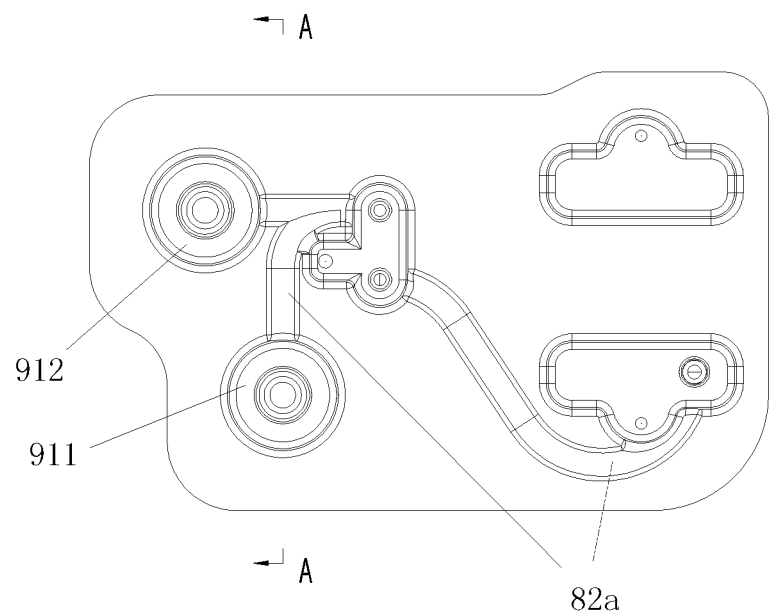
FIG. 3 is a schematic top view showing the structure of the communication device shown in FIG. 2.
Figure 4:
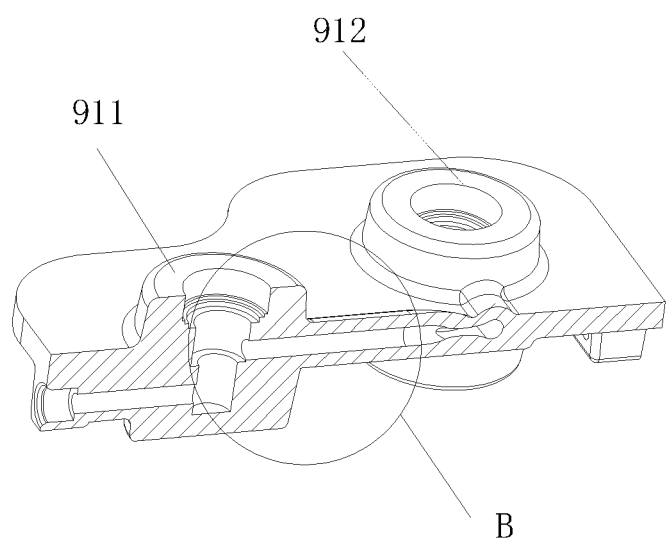
FIG. 4 is a schematic cross-sectional view of the communication device shown in FIG. 3 taken along A-A.
Figure 5:
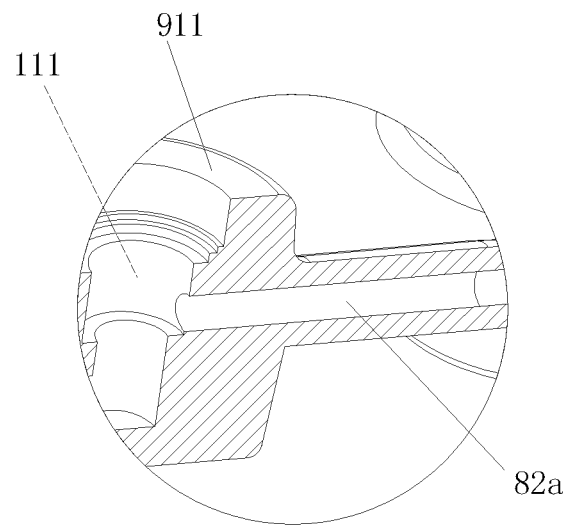
FIG. 5 is an enlarged schematic view showing the structure of a portion B in FIG. 4.
Figure 9:
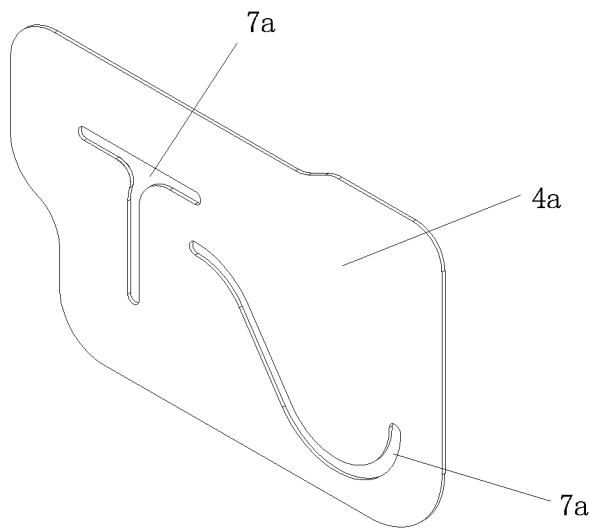
FIG. 9 is a three-dimensional schematic view showing the structure of a fourth plate body obtained by step S1 in a method for manufacturing the communication device in FIG. 1.

The second channel 82a is formed by the second sunken groove 62a of the third plate body 3a, the through groove 7a of the fourth plate body 4a and the sunken groove 6a of the fifth plate body 5a, as shown in FIGS. 2 and 9, the through groove 7a of the fourth plate body 4a has a shape the same as that of the second channel 82a, the number of the second channel 82a is two, the two second channels 82a are T-shaped and J-shaped respectively. The T-shaped second channel 82a has three ends, each of the three ends is in communication with a corresponding mounting hole, and the J-shaped second channel 82a has two ends, each of the two ends is in communication with a corresponding mounting hole or communication hole, so that the second channel 82a is in communication with the valve device mounted on the corresponding mounting portion (i.e. a first mounting portion 91, a second mounting portion 92) through the mounting hole, and the second channel 82a is in communication with the thermal management unit mounted on the corresponding communication portion (i.e. a first communication portion 310, a second communication portion 320) through the communication hole.

Multiple valve devices and multiple thermal management units are required to be arranged, by providing the stacked five plate bodies, portions of the plate bodies that are not provided with the first channel 81a or the second channel 82a are utilized to a maximum extent. A complex spatial channel is formed by stacking the plate bodies, which meets different requirements of arrangement of different components and reduces the positional limitation of the arrangement of the components, thereby improving the utilization of the internal space.

It should be noted that in the above description, the shape and the number of the first channel 81a and the second channel 82a may be set according to the actual requirements of the thermal management assembly.

As shown in FIGS. 1 and 2, the mounting portion includes a first mounting portion 91, the communication portion includes a first communication portion 310, the first mounting portion 91 and the first communication portion 310 are each arranged in the axial direction of the communication device. The first mounting portion 91 and the first communication portion 310 each protrudes from the plate bodies located at two ends of the communication device. The mounting hole includes a first mounting hole 110, and the first communication portion 310 includes a first communication hole 410, the first mounting hole 110 and the first communication hole 410 are each axially formed in the plate bodies and in communication with the channel, at least part of the valve device is inserted into the first mounting hole 110, and the inlet or outlet of at least one of the thermal management unit is in communication with the first communication hole 410.

The mounting portion further includes a second mounting portion 92, and the communication portion includes a second communication portion 320, each is arranged in an extension direction of the communication device. The extension direction is perpendicular to the axial direction of the communication device. The second mounting portion 92 and the second communication portion 320 protrude from the plate bodies located at two ends of the communication device. The mounting hole includes a second mounting hole 120, the second communication portion 320 is provided with a second communication hole 420, the extension direction of the second mounting hole 120 and the extension direction of the second communication hole 420 are each parallel to an extension direction of the communication device, the second mounting hole 120 and the second communication hole 420 are formed in side walls of the adjacent plate bodies and in communication with the channel, at least part of the valve device is inserted into the second mounting hole 120, and the inlet or outlet of at least one of the thermal management unit is in communication with the second communication hole 420.

The above valve device may be a throttling element, an electromagnetic valve, or a switching valve. The above thermal management unit may be a heat exchange portion or a reservoir. The above throttling element, for example, may be an electronic expansion valve. The above heat exchange portion, for example, may be a plate-type heat exchanger.

It should be noted that, depending on the requirements of the vehicle thermal management system, components may be arranged at the mounting portion, and the mounting hole may be in communication with the valve device; components may be provided at the communication portion, and the communication hole may be in communication with the inlet or the outlet of the thermal management unit. In an embodiment, a first electronic expansion valve is connected with the first mounting portion 91, part of the first electronic expansion valve is inserted into the first mounting hole 110, after the first electronic expansion valve is mounted in the first mounting hole 110, the first electronic expansion valve is in communication with the first channel 81a through the first mounting hole 110. The reservoir is connected with the first communication portion 311, an inlet of the reservoir is in communication with the first communication hole 412, and an output of the reservoir is in communication with the first communication hole 413. The reservoir is in communication with an end of the J-shaped second channel 82a through the first communication hole 412, and the reservoir is in communication with the T-shaped second channel 82a through the first communication hole 413. A second electronic expansion valve is connected with the first mounting portion 911, part of the second electronic expansion valve is inserted into the first mounting hole 111, after the second electronic expansion valve is mounted in the first mounting hole 111, the second electronic expansion valve is in communication with an end of the T-shaped second channel 82a through the first mounting hole 111. A third electronic expansion valve is connected with the first mounting portion 912, and part of the third electronic expansion valve is inserted into the first mounting hole 112, after the third electronic expansion valve is mounted in the first mounting hole 112, the third electronic expansion valve is in communication with an end of the T-shaped second channel 82a through the first mounting hole 112. The heat exchanger is in communication with the first communication portion 310, an inlet of the heat exchanger is in communication with the first communication hole 410, an outlet of the heat exchanger is in communication with the first communication hole 411, and the heat exchanger is in communication with the first channel 81a through the first communication hole; the second mounting hole 120 is in communication with an outlet of the third electronic expansion valve, and the second communication hole 420 is in communication with the outlet of the heat exchanger.

The third plate body 3a includes a thick body portion 31a and a thin body portion, an upper surface of the thick body portion 31a is fixedly welded and sealingly connected to the second plate body 2a, and both a lower surface of the thin body portion and a lower surface of the thick body portion 31a are fixedly welded and sealingly connected to the fourth plate body 4a. The thick body portion 31a is provided with a first sunken groove 61a and the thin body portion is provided with a second sunken groove 62a.

Figure 8:
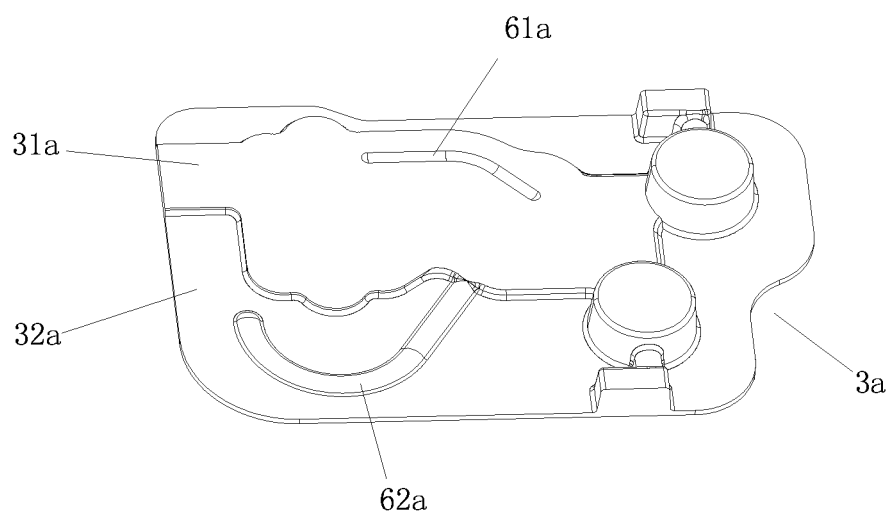
FIG. 8 is a three-dimensional schematic view showing the structure of a third plate body obtained by step S1 in a method for manufacturing the communication device in FIG. 1.

It should be noted that the second sunken groove 62a formed in the thin body portion protrudes in a direction approaching the second plate body 2a, and it is difficult to arrange other plate bodies at a position, at which the second sunken groove 62a is formed, of the upper surface of the thin body portion. As shown in FIG. 8, with the provision of the thick body portion 31a, part of the second sunken groove 62a can be covered, thereby providing a space for arranging other plate bodies; besides, a space, where the second sunken groove 62a is not arranged, of the third plate body 3a can be utilized to a maximum extent; in addition, with the thick body portion 31a, part, where the first sunken groove 61a is formed, of the lower surface of the thick body portion 31a is flat, so that the lower surface of the thick body portion 31a can be secured to the fourth plate body 4a by welding, which effectively avoids a situation of an uneven contact surface of welding.

In an embodiment, each of cross-section areas of the first plate body 1a and the second plate body 2a is smaller than a cross-section area of the thick body portion 31a; the fourth plate body 4a, the fifth plate body 5a and the third plate body 3a have the same shape and the same dimension. In other embodiments, each of cross-section areas of the second plate body 2a and the first plate body 1a may be equal to the cross-section area of the thick body portion 31a.

It should be understood that the second plate body 2a and the first plate body 1a are stacked onto the thick body portion 31a in sequence, to use the space, where the second sunken groove 62a is not arranged, of the third plate body 3a, so that the space can be utilized to a maximum extent, which effectively avoids a situation of an uneven contact surface of welding. The fourth plate body 4a, the fifth plate body 5a and the third plate body 3a have the same shape and the same dimension, which facilitates fixation by welding.

Referring further to FIGS. 1 and 2, and FIGS. 6 to 14, the communication device according to the embodiment of the present application may be manufactured by the following steps.

In step S1, five blank plates are provided, side walls of the two blank plates are provided with the mounting portion and the communication portion in an axial direction and a radial direction of the communication device. That is, from top to bottom, side walls of a first blank plate and a fifth blank plate are provided with the mounting portion and the communication portion. A channel portion is manufactured in adjacent blank plates, to obtain plate bodies (i.e. the first plate body 1a, the second plate body 2a, the third plate body 3a, the fourth plate body 4a and the fifth plate body 5a) having the channel portions.

Figure 6:
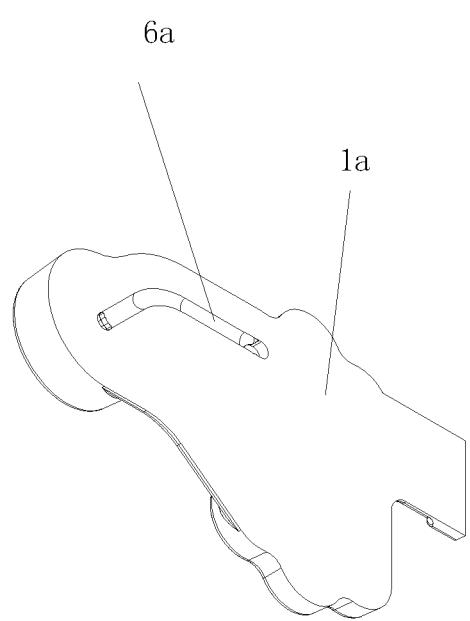
FIG. 6 is a three-dimensional schematic view showing the structure of a first plate body obtained by step S1 in a method for manufacturing the communication device in FIG. 1.

The first plate body 1a is shown in FIG. 6, where the sunken groove 6a is formed in the first plate body 1a; the second plate body 2a is shown in FIG. 7, where the through groove 7a is formed in the second plate body 2a; the third plate body 3a is shown in FIG. 8, where the first sunken groove 61a is formed in the third plate body 3a; the sunken groove 6a, the through groove 7a and the first sunken groove 61a form the first channel 81a.

As shown in FIG. 8, the second sunken groove 62a is further formed in the third plate body 3a. The third plate body 3a includes the thick body portion 31a and the thin body portion 32a.

The fourth plate body 4a is shown in FIG. 9, where two through grooves 7a are formed in the fourth plate body 4a.

Figure 10:
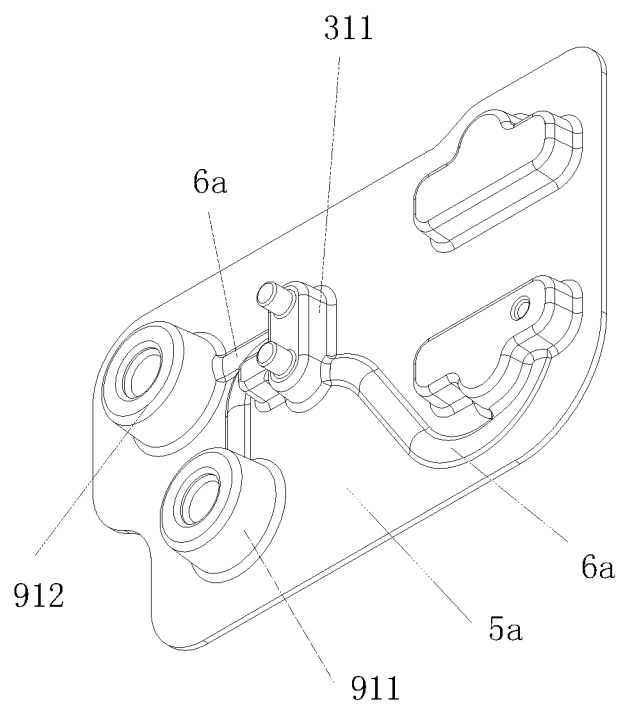
FIG. 10 is a three-dimensional schematic view showing the structure of a fifth plate body obtained by step S1 in a method for manufacturing the communication device in FIG. 1 from a viewpoint.
Figure 11:
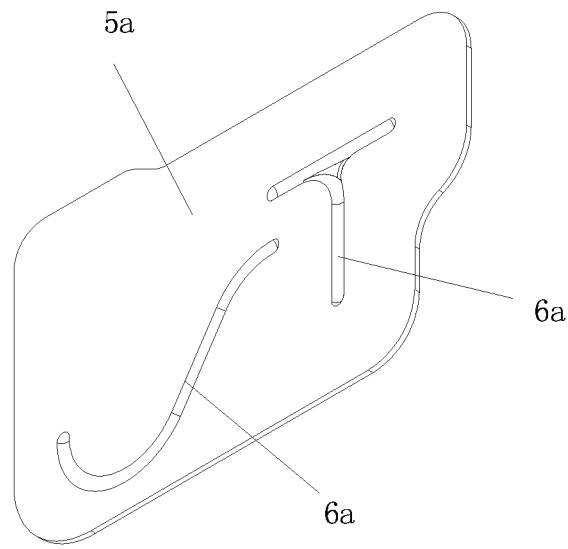
FIG. 11 is a three-dimensional schematic view showing the structure of the fifth plate body shown in FIG. 10 from another viewpoint.

The fifth plate body 5a is shown in FIGS. 10 and 11, two sunken grooves 6a are formed in the fifth plate body 5a; the second sunken groove 62a, the through groove 7a and the sunken groove 6a form the second channel 82a; and the first communication portion 310 is arranged in the fifth plate body 5a.

Figure 12:
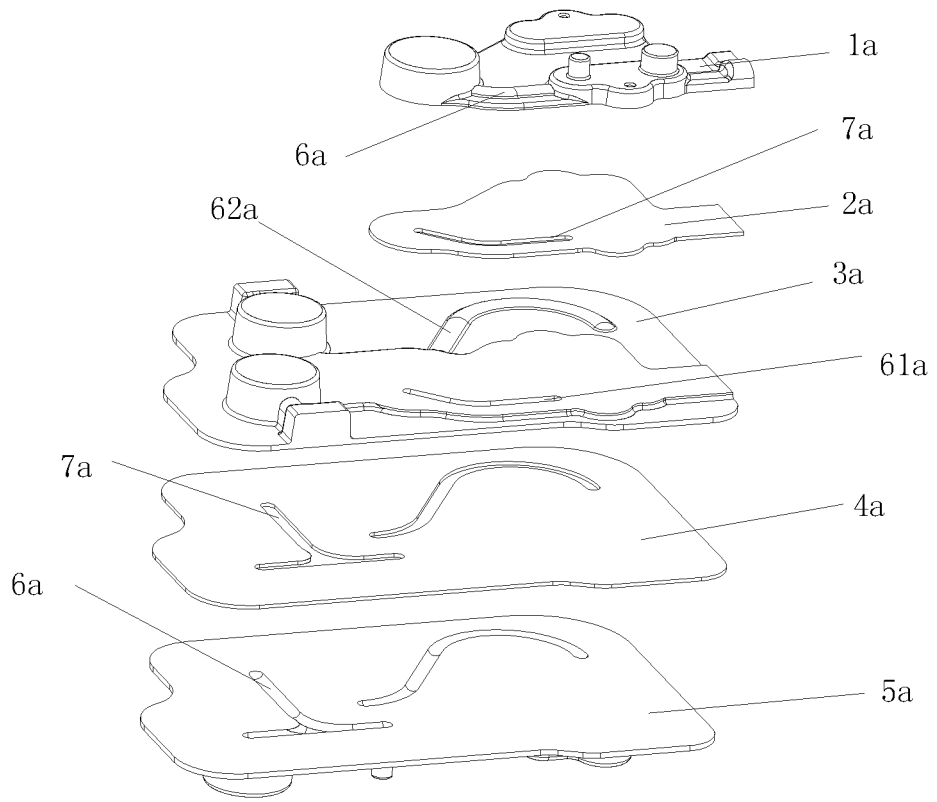
FIG. 12 is a schematic structural view showing plate bodies stacked in sequence in step S2 in the method for manufacturing the communication device shown in FIG. 1.
Figure 13:
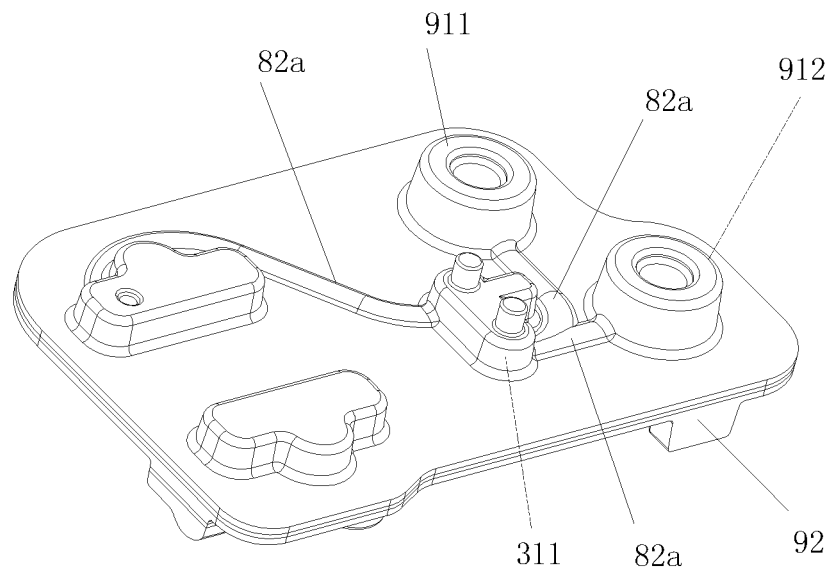
FIG. 13 is a three-dimensional schematic view showing the structure of the plate bodies being welded in step S2 in the method for manufacturing the communication device shown in FIG. 1 from a viewpoint.
Figure 14:
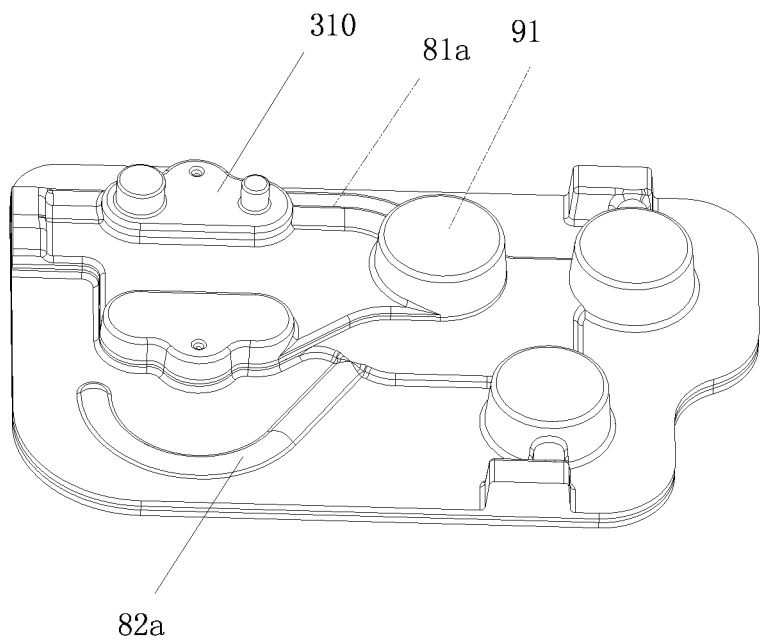
FIG. 14 is a three-dimensional schematic view showing the structure of the plate bodies being welded as shown in FIG. 13 from another viewpoint.

In step S2, adjacent plate bodies (the first plate body 1a, the second plate body 2a, the third plate body 3a, the fourth plate body 4a, and the fifth plate body 5a as shown in FIG. 12) are stacked in sequence, and the adjacent plate bodies are secured to each other and connected in a sealed manner to obtain the first channel 81a as shown in FIG. 14 and the second channel 82a as shown in FIG. 13.

In step S3, the mounting hole is formed in the mounting portion of the plate bodies after the connection in a sealed manner, to obtain the communication device, and the communication device as shown in FIGS. 1 and 2 is obtained.

It should be understood that the blank plates are processed, for example, by forging, stamping or casting, to obtain plate bodies with channel portions. A joint surface of the second plate body 2a with the first plate body 1a and a joint surface of the second plate body 2a with the third plate body 3a each is coated with a composite welding layer, and a joint surface of the fourth plate body 4a with the third plate body 3a and a joint surface of the fourth plate body 4a with the fifth plate body 5a each is coated with a composite welding layer. During welding, the welding layer is heated until the welding layer melts so that the liquid welding layer on the second plate body 2a spreads to a surface of the first plate body 1a and a surface of the third plate body 3a, the liquid welding layer on the fourth plate body 4a spreads to the surface of the third plate body 3a and a surface of the fifth plate body 5a; after being cooled, the second plate body 2a is fixedly welded and sealingly connected to the first plate body 1a and the third plate body 3a; the fourth plate body 4a is fixedly welded and sealingly connected to the third plate body 3a and the fifth plate body 5a. After welding, mounting holes are correspondingly processed in the mounting portions according to arrangement requirements of different valve devices, and communication holes are correspondingly processed in the communication portions according to arrangement requirements of different thermal management units.

Figure 15:
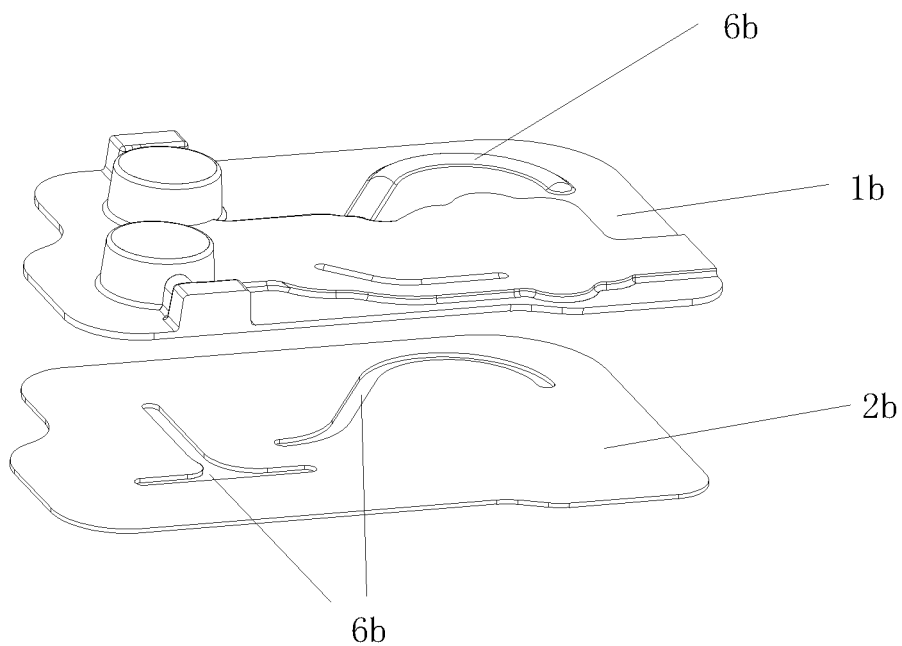
FIG. 15 is an exploded schematic view showing a communication device according to a second embodiment of the present application.

Referring to FIG. 15, in a second embodiment of the present application, the communication device includes two plate bodies, one of which is defined as a first plate body 1b, and a plate body adjacent to the first plate body 1b is defined as a second plate body 2b. A channel portion of the first plate body 1b and a channel portion of the second plate body 2b each is a sunken groove 6b, the first plate body 1b and the second plate body 2b are secured to each other and connected in a sealed manner, and the two sunken grooves 6b are in communication with each other and form a channel.

It will be understood that the channel is in communication with the mounting hole in the mounting portion, and the channel is also in communication with the communication hole in the communication portion. Two channels are provided in this embodiment, and in other embodiments, the shape and the number of the channel may be changed according to requirements of the arrangement of the thermal management assembly, so that the arrangement of the thermal management assembly is not limited by the position, so as to improve the utilization of the space.

It is to be noted that, depending on the requirements of the vehicle thermal management system, components may be arranged at the mounting portion, and the mounting hole is in communication with the valve device; components may be arranged at the communication portion, and the communication hole is in communication with the inlet or the outlet of the thermal management unit.

The welding layer may be set in different ways, in this embodiment, a surface, coated with the composite welding layer, of the first plate body 1b is secured to the second plate body 2b by fusion welding.

In another embodiment, a solder layer is provided between the first plate body 1b and the second plate body 2b before the welding, and after the welding, the solder layer melts and spreads onto the first plate body 1b and the second plate body 2b, to secure the first plate body 1b to the second plate body 2b by welding.

Figure 16:
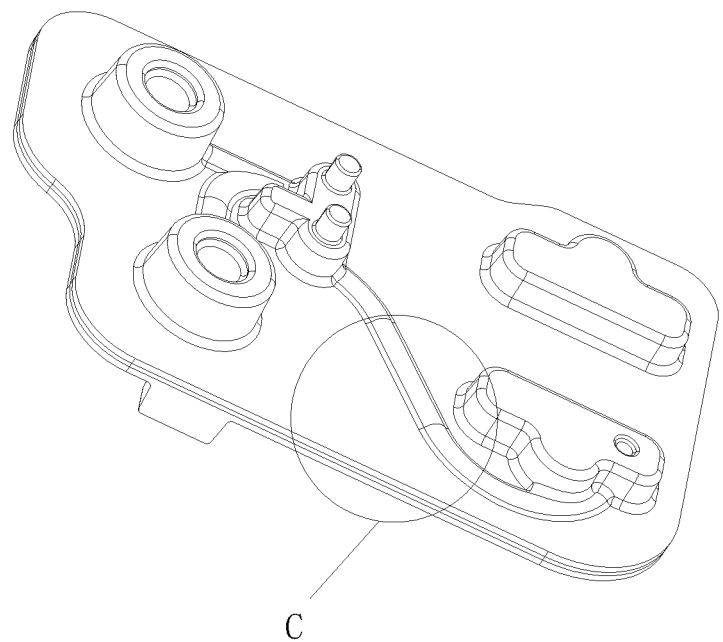
FIG. 16 is a three-dimensional schematic view showing the structure of a communication device according to a third embodiment of the present application.
Figure 17:
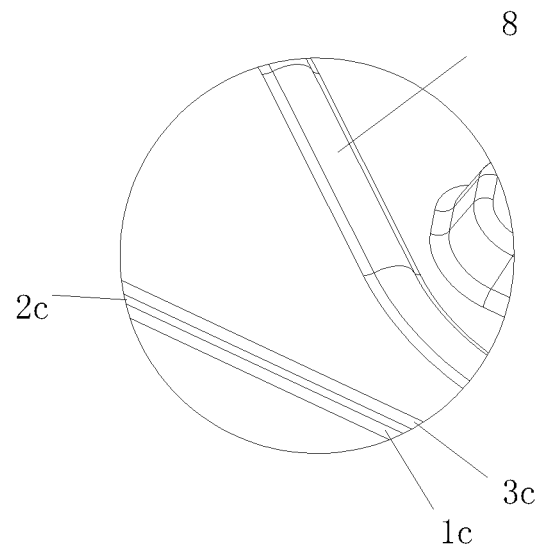
FIG. 17 is an enlarged schematic view showing the structure of a portion C shown in FIG. 16.
Figure 18:
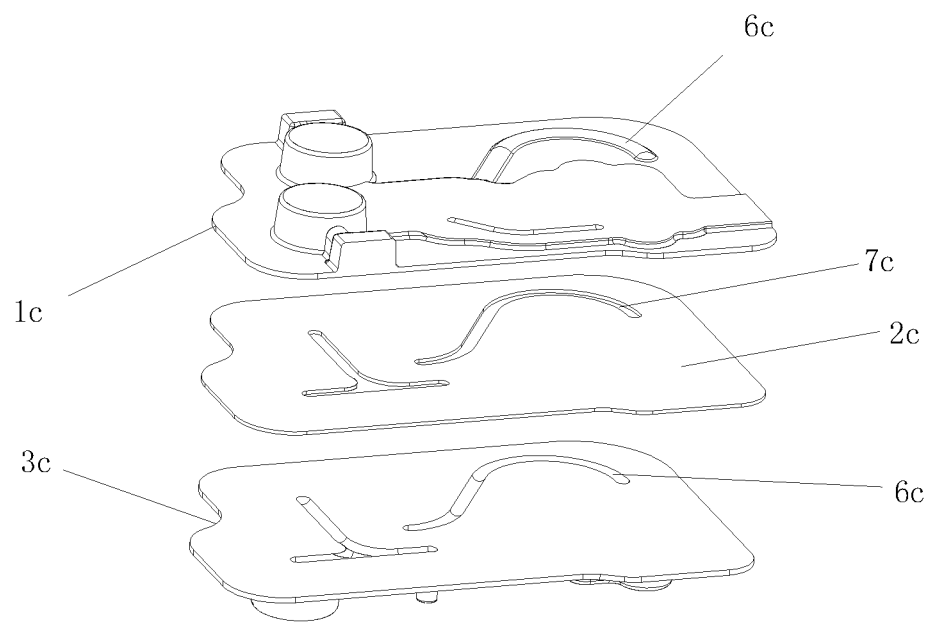
FIG. 18 is an exploded schematic view of the communication device shown in FIG. 16.
Figure 19:
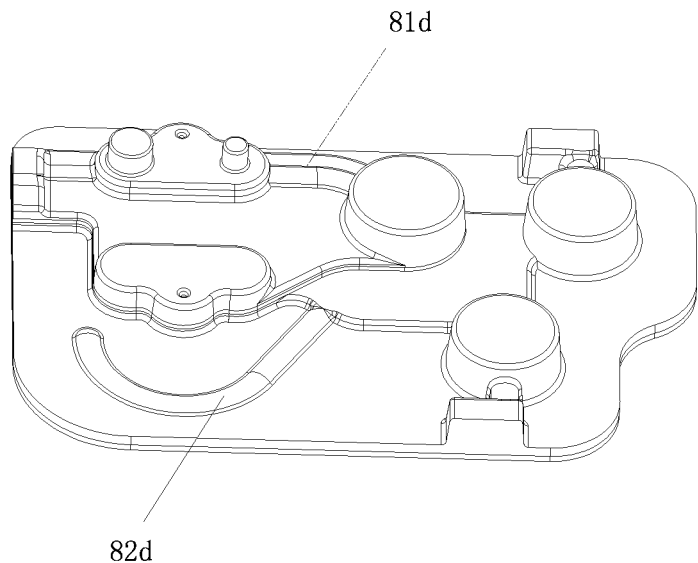
FIG. 19 is a three-dimensional schematic view showing the structure of a communication device according to a fourth embodiment of the present application from a viewpoint.

Referring to FIG. 16 to FIG. 18, in a third embodiment of the present application, the communication device includes three plate bodies, one of the plate bodies is defined as a first plate body 1c, a plate body adjacent to the first plate body 1c is defined as a second plate body 2c, and another plate body adjacent to the second plate body 2c is defined as a third plate body 3c; the second plate body 2c is arranged between the first plate body 1c and the third plate body 3c, one side of the second plate body 2c is secured to and connected in a sealed manner to the first plate body, and the other side of the second plate body 2c is secured to and connected in a sealed manner to the third plate body 3c. A channel portion of the second plate body 2c is a through groove 7c, a channel portion of the first plate body 1c and a channel portion of the third plate body 3c each is a sunken groove 6c. The adjacent plate bodies are secured to each other by welding, before the welding, a joint surface of the second plate body 2c with the first plate body 1c and a joint surface of the second plate body 2c with the third plate body 3c each is coated with a composite welding layer. In other embodiments, the second plate body 2c may be partially arranged between the first plate body 1c and the third plate body 3c.

It should be understood that the number of the channel 8 is two, each channel 8 is formed by two sunken grooves 6c and one through groove 7c, resulting in an increased internal space of the channel 8, thus more fluid medium can be stored. A joint surface of the second plate body 2c with the first plate body 1c and a joint surface of the second plate body 2c with the third plate body 3c each is coated with a composite welding layer. The composite welding layers are provided on the second plate body 2c for welding and fixing the first plate body 1c and the third plate body 3c.

It is to be noted that, depending on the requirements of the vehicle thermal management system, components may be arranged at the mounting portion, and the mounting hole is in communication with the valve device; components may be provided at the communication portion, and the communication hole is in communication with the inlet or the outlet of the thermal management unit. In an embodiment, part of the switching valve is arranged in the first mounting hole, and the switching valve is in communication with one of the channels 8 through the first mounting hole; the first communication hole in the first communication portion is in communication with the inlet or outlet of the reservoir, and the reservoir is in communication with the other of the channels 8 through the first communication hole.

The inner wall of the channel 8 is arc-shaped, it should be understood that, in this way, a resistance of the fluid medium flowing through the channel 8 is reduced, so as to reduce a resistance loss of the fluid medium.

Referring to FIG. 19 to FIG. 22, in a fourth embodiment of the present application, the communication device includes three plate bodies, from top to bottom, one of the plate bodies is defined as a first plate body 1d, a plate body adjacent to the first plate body 1d is defined as a second plate body 2d, and another plate body adjacent to the second plate body 2d is defined as a third plate body 3d; the second plate body 2d is arranged between the first plate body 1d and the third plate body 3d. A channel portion of the first plate body 1d and a channel portion of the third plate body 3d each is a sunken groove 6d. The second plate body 2d includes two channel portions, each of the two channel portions of the second plate body 2d is a sunken groove 6d, one of the sunken grooves 6d of the second plate body 2d is defined as a first sunken groove 61d and the other of the sunken groove 6d is defined as a second sunken groove 62d. The channel includes a first channel 81d and a second channel 82d, the first channel 81d is formed by the sunken groove 6d of the first plate body 1d and the first sunken groove 61d of the second plate body 2d, and the second channel 82d is formed by the second sunken groove 62d of the second plate body 2d and the sunken groove 6d of the third plate body 3d. The channel is in communication with a corresponding valve device through a mounting hole, and the channel is in communication with a corresponding thermal management unit through a communication hole. In other embodiments, the second plate body 2d may be only partially arranged between the first plate body 1d and the third plate body 3d.

Figure 20:
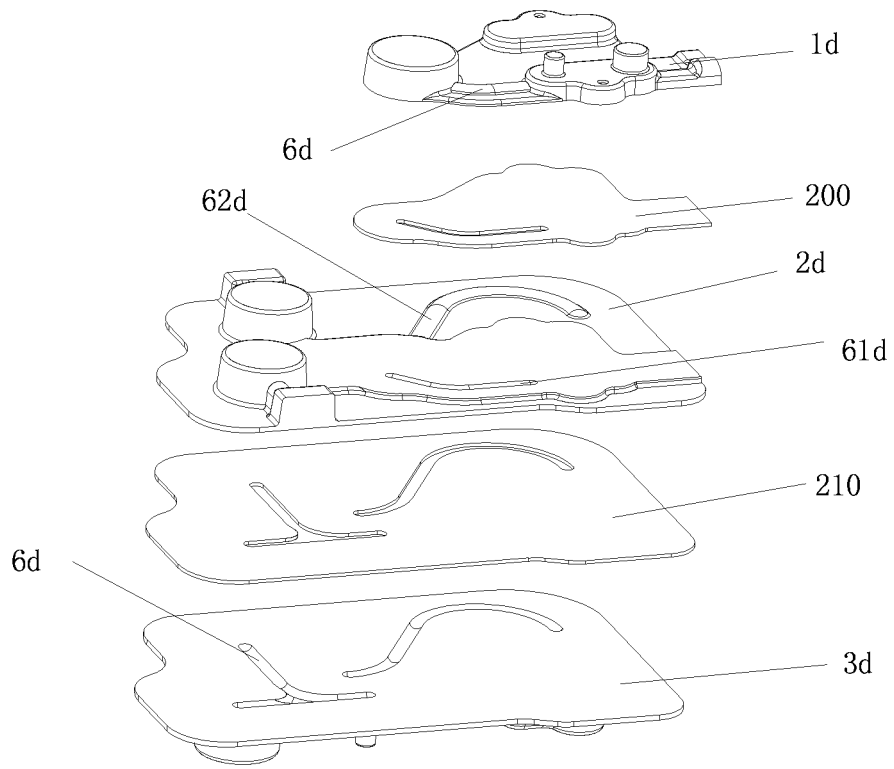
FIG. 20 is an exploded schematic view showing plate bodies and solder layers in the communication device shown in FIG. 19.
Figure 21:
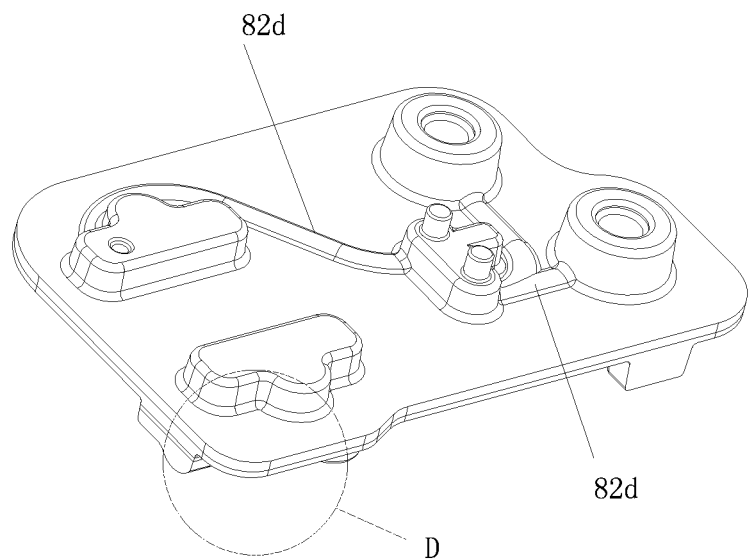
FIG. 21 is a three-dimensional schematic view showing the structure of the communication device shown in FIG. 20 from another viewpoint.
Figure 22:
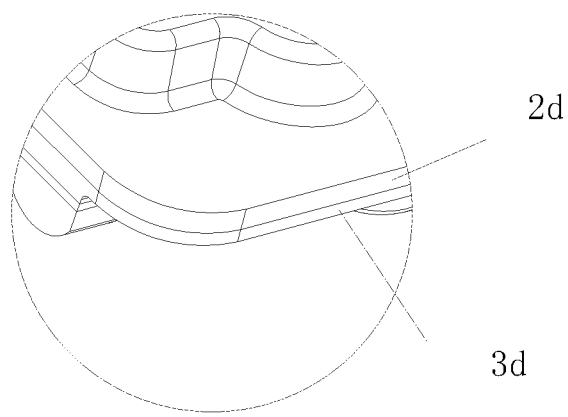
FIG. 22 is an enlarged schematic view showing the structure of a portion D in FIG. 21.

The welding layer may be set in different ways. In an embodiment, the first plate body 1d, the second plate body 2d and the third plate body 3d are secured to each other by welding and connected in a sealed manner. As shown in FIG. 20, a first solder layer 200 is provided between the first plate body 1d and the second plate body 2d before the welding, and a through groove is formed in the first solder layer 200; a second solder layer 210 is provided between the second plate body 2d and the third plate body 3d, and a through groove is formed in the second solder layer 210. The first plate body 1d is fusion welded to the second plate body 2d via the first solder layer 200, and the second plate body 2d is fusion welded to the third plate body 3d via the second solder layer 210.

It should be understood that the first plate body 1d and the second plate body 2d are secured by welding and connected in a sealed manner via the first solder layer 200, the second plate body 2d and the third plate body 3d are secured by welding and connected in a sealed manner via the second solder layer 210. The first solder layer 200 and the second solder layer 210 after the welding melt and spread into a surface layer of the adjacent plate body, which reduces the thickness and the height of the communication device, making the overall structure more compact, thereby reducing the space occupied in the vehicle.

In another embodiment, the difference from the previous embodiment lies in that a surface, coated with the composite welding layer, of the first plate body 1d is secured to the second plate body 2d by welding, and a face, away from the first plate body 1d, of the second plate body 2d is coated with the composite welding layer and secured to the third plate body 3d by welding.

A thermal management assembly is further provided according to the present application, including a thermal management unit, a valve device and a communication device. The structure of the communication device may be referred to FIG. 1 to FIG. 22. The thermal management unit includes at least one of a heat exchange portion and a reservoir, the valve device includes at least one of a throttling element, an electromagnetic valve and a switching valve. The communication device includes two or more plate bodies, adjacent plate bodies of the plate bodies are secured to each other and connected in a sealed manner, the communication device is provided with a channel, at least one channel portion is arranged inside at least one of the adjacent plate bodies, and the channel is formed at the channel portion by the adjacent plate bodies, where in an axial direction or a radial direction of the communication device, one of side walls of at least one of the plate bodies is provided with a mounting portion and/or a communication portion, the mounting portion is provided with a mounting hole, at least part of the valve device is arranged in the mounting hole, the communication portion is provided with a communication hole, and an inlet or outlet of at least one of the thermal management unit is in communication with the communication hole.

It should be understood that in a case that multiple thermal management assemblies, for example, a heat exchanger portion, a reservoir, a throttling element, an electromagnetic valve and a switching valve, are required to be provided, multiple plate bodies may be stacked as required, with a channel being formed at the channel portions of adjacent plate bodies. A complex spatial channel can be formed in the communication device, so that the arrangement of components in the vehicle thermal management system is not limited by the position, which improves the utilization of the space in the vehicle thermal management system.

It should be noted that in the above description, the orientation or positional relationships indicated by terms such as "upper", "lower" and the like are based on the orientation or positional relationships shown in the drawings, which are merely for the convenience of describing the present application and the simplification of the description, and do not indicate or imply that the device or element referred to must have a particular orientation, or be configured and operated in the particular orientation, and therefore should not be construed as a limitation to the present application.

The above embodiments are only preferred embodiments of the present application and cannot be used to limit the scope of protection of the present application. Any non-substantive variations and substitutions made by those skilled in the art on the basis of the present application are within the scope of protection claimed by the present application.

The invention claimed is:

1. A communication device, applicable to a thermal management assembly, wherein
the communication device comprises two or more plate bodies, adjacent plate bodies of the plate bodies are secured to each other and connected in a sealed manner, the communication device is provided with a channel, at least one channel portion is provided inside at least one of the adjacent plate bodies of the plate bodies, and at least part of the channel is formed at the channel portion by the adjacent plate bodies; wherein
in an axial direction or a radial direction of the communication device, one of side walls of at least one of the plate bodies is provided with at least one mounting portion and/or at least one communication portion, the mounting portion is provided with a mounting hole, the thermal management assembly comprises a valve device for controlling a flow rate or blocking/unblocking of the channel, the mounting hole is configured to accommodate at least part of the valve device, the channel is in communication with the mounting hole of the at least one mounting portion; and wherein
the communication portion is provided with a communication hole, the thermal management assembly further comprises at least one thermal management unit, the communication hole is configured to be in communication with one of an inlet or an outlet of the at least one thermal management unit, and the channel is in communication with the at least one communication hole.

2. The communication device according to claim 1, wherein the communication device comprises two plate bodies, one of the two plate bodies is defined as a first plate body and a plate body adjacent to the first plate body is defined as a second plate body, the first plate body and the second plate body are arranged adjacent to each other, the first plate body and the second plate body are each provided with the channel portion embodied as a sunken groove, the first plate body and the second plate body are secured to each other and connected in a sealed manner; the two sunken grooves are in communication with each other to form the channel, or the two sunken grooves together with walls respectively facing the two sunken grooves form the channel; the adjacent plate bodies are secured by welding, before the welding, a joint surface of one of the adjacent plate bodies is coated with a composite welding layer, or a solder layer is arranged between the adjacent plate bodies.

3. The communication device according to claim 2, wherein the mounting portion comprises a first mounting portion, the communication portion comprises a first communication portion, the first mounting portion and the first communication portion each is arranged in the axial direction of the communication device, the first mounting portion and the first communication portion each protrudes from the plate bodies located at two ends of the communication device; and
the mounting hole comprises a first mounting hole, the first communication portion comprises a first communication hole, the first mounting hole and the first communication hole each is formed in the plate bodies in the axial direction and in communication with the channel; at least part of the valve device is inserted in the first mounting hole, and the inlet or the outlet of the at least one of the thermal management unit is in communication with the first communication hole; the valve device comprises at least one of a throttling element, an electromagnetic valve and a switching valve, and the thermal management unit comprises at least one of a heat exchange portion and a reservoir.

4. The communication device according to claim 2, wherein the mounting portion further comprises a second mounting portion, the communication portion comprises a second communication portion, the second mounting portion and the second communication portion each is arranged in an extension direction of the communication device, the extension direction of the communication device is perpendicular to the axial direction of the communication device, the second mounting portion and the second communication portion each protrudes from the plate bodies located at two ends of the communication device; and
the mounting hole comprises a second mounting hole, the second communication portion is provided with a second communication hole, the second mounting hole and the second communication hole each extends in a direction parallel to the extension direction of the connection device, the second mounting hole and the second communication hole each is formed in side walls of the adjacent plate bodies and each is in communication with the channel; at least part of the valve device is inserted into the second mounting hole, and the inlet or outlet of the at least one of the thermal management unit is in communication with the second communication hole; the valve device comprises at least one of a throttling element, an electromagnetic valve and a switching valve, and the thermal management unit comprises at least one of a heat exchange portion and a reservoir.

5. A method for manufacturing the communication device according to claim 2, comprising:
S1, providing two or more blank plates, wherein in the axial direction or the radial direction of the communication device, one of side walls of at least one of the blank plates is provided with the mounting portion and/or the communication portion; and processing a channel portion in at least one of adjacent blank plates to obtain the plate body having the channel portion;
S2, stacking the adjacent plate bodies in sequence, and securing the adjacent plate bodies to each other and connecting the adjacent plate bodies in a sealed manner, wherein the channel is formed at the channel portion by the adjacent plate bodies; and S3, after connection in the sealed manner, processing the mounting hole in the mounting portion of the plate bodies and/or processing the communication hole in the communication portion.

6. The communication device according to claim 1, wherein the communication device comprises three plate bodies, one of the three plate bodies is defined as a first plate body, another one of the plate bodies adjacent to the first plate body is defined as a second plate body, and yet another one of the plate bodies adjacent to the second plate body is defined as a third plate body; at least part of the second plate body is located between the first plate body and the third plate body, one side of the second plate body is secured to and connected in a sealed manner to the first plate body, another side of the second plate body is secured to and connected in a sealed manner to the third plate body, the channel portion of the second plate body is a through groove, the channel portion of the first plate body and the channel portion of the third plate body each is a sunken groove, the adjacent plate bodies are secured by welding, and before the welding, a joint surface of the second plate body with the first plate body and another joint surface of the second plate body with the third plate body each is coated with a composite welding layer.

7. The communication device according to claim 6, wherein the mounting portion comprises a first mounting portion, the communication portion comprises a first communication portion, the first mounting portion and the first communication portion each is arranged in the axial direction of the communication device, the first mounting portion and the first communication portion each protrudes from the plate bodies located at two ends of the communication device; and the mounting hole comprises a first mounting hole, the first communication portion comprises a first communication hole, the first mounting hole and the first communication hole each is formed in the plate bodies in the axial direction and in communication with the channel; at least part of the valve device is inserted in the first mounting hole, and the inlet or the outlet of the at least one of the thermal management unit is in communication with the first communication hole; the valve device comprises at least one of a throttling element, an electromagnetic valve and a switching valve, and the thermal management unit comprises at least one of a heat exchange portion and a reservoir.

8. The communication device according to claim 6, wherein the mounting portion further comprises a second mounting portion, the communication portion comprises a second communication portion, the second mounting portion and the second communication portion each is arranged in an extension direction of the communication device, the extension direction of the communication device is perpendicular to the axial direction of the communication device, the second mounting portion and the second communication portion each protrudes from the plate bodies located at two ends of the communication device; and the mounting hole comprises a second mounting hole, the second communication portion is provided with a second communication hole, the second mounting hole and the second communication hole each extends in a direction parallel to the extension direction of the connection device, the second mounting hole and the second communication hole each is formed in side walls of the adjacent plate bodies and each is in communication with the channel; at least part of the valve device is inserted into the second mounting hole, and the inlet or outlet of the at least one of the thermal management unit is in communication with the second communication hole; the valve device comprises at least one of a throttling element, an electromagnetic valve and a switching valve, and the thermal management unit comprises at least one of a heat exchange portion and a reservoir.

9. A method for manufacturing the communication device according to claim 6, comprising:

S1, providing two or more blank plates, wherein in the axial direction or the radial direction of the communication device, one of side walls of at least one of the blank plates is provided with the mounting portion and/or the communication portion; and processing a channel portion in at least one of adjacent blank plates to obtain the plate body having the channel portion;

S2, stacking the adjacent plate bodies in sequence, and securing the adjacent plate bodies to each other and connecting the adjacent plate bodies in a sealed manner, wherein the channel is formed at the channel portion by the adjacent plate bodies; and S3, after connection in the sealed manner, processing the mounting hole in the mounting portion of the plate bodies and/or processing the communication hole in the communication portion.

10. The communication device according to claim 1, wherein the communication device comprises three plate bodies, one of the three plate bodies is defined as a first plate body, another one of the plate bodies adjacent to the first plate body is defined as a second plate body, and yet another one of the plate bodies adjacent to the second plate body is defined as a third plate body;

at least part of the second plate body is located between the first plate body and the third plate body, the channel portion of the first plate body and the channel portion of the third plate body each is a sunken groove, the second plate body comprises two channel portions, both the two channel portions of the second plate body are sunken grooves, one of the sunken grooves of the second plate body is defined as a first sunken groove and the other of the sunken grooves of the second plate body is defined as a second sunken groove, the channel comprises a first channel and a second channel; the first channel is formed by the sunken groove of the first plate body and the first sunken groove of the second plate body, and the second channel is formed by the second sunken groove of the second plate body and the sunken groove of the third plate body; wherein the first plate body, the second plate body and the third plate body are secured by welding and connected in a sealed manner; and wherein before the welding, a first solder layer is arranged between the first plate body and the second plate body, and a second solder layer is arranged between the second plate body and the third plate body; the first plate body is fusion welded to the second plate body via the first solder layer, the second plate body is fusion welded to the third plate body via the second solder layer melting; or, before the welding, at least one of the first plate body and the second plate body is coated with a composite welding layer on a joint surface, and at least one of the second plate body and the third plate body is coated with a composite welding layer on a joint surface.

11. The communication device according to claim 10, wherein the mounting portion comprises a first mounting portion, the communication portion comprises a first communication portion, the first mounting portion and the first communication portion each is arranged in the axial direction of the communication device, the first mounting portion and the first communication portion each protrudes from the plate bodies located at two ends of the communication device; and the mounting hole comprises a first mounting hole, the first communication portion comprises a first communication hole, the first mounting hole and the first communication hole each is formed in the plate bodies in the axial direction and in communication with the channel; at least part of the valve device is inserted in the first mounting hole, and the inlet or the outlet of the at least one of the thermal management unit is in communication with the first communication hole; the valve device comprises at least one of a throttling element, an electromagnetic valve and a switching valve, and the thermal management unit comprises at least one of a heat exchange portion and a reservoir.

12. The communication device according to claim 10, wherein the mounting portion further comprises a second mounting portion, the communication portion comprises a second communication portion, the second mounting portion and the second communication portion each is arranged in an extension direction of the communication device, the extension direction of the communication device is perpendicular to the axial direction of the communication device, the second mounting portion and the second communication portion each protrudes from the plate bodies located at two ends of the communication device; and the mounting hole comprises a second mounting hole, the second communication portion is provided with a second communication hole, the second mounting hole and the second communication hole each extends in a direction parallel to the extension direction of the connection device, the second mounting hole and the second communication hole each is formed in side walls of the adjacent plate bodies and each is in communication with the channel; at least part of the valve device is inserted into the second mounting hole, and the inlet or outlet of the at least one of the thermal management unit is in communication with the second communication hole; the valve device comprises at least one of a throttling element, an electromagnetic valve and a switching valve, and the thermal management unit comprises at least one of a heat exchange portion and a reservoir.

13. A method for manufacturing the communication device according to claim 10, comprising:

S1, providing two or more blank plates, wherein in the axial direction or the radial direction of the communication device, one of side walls of at least one of the blank plates is provided with the mounting portion and/or the communication portion; and processing a channel portion in at least one of adjacent blank plates to obtain the plate body having the channel portion;

S2, stacking the adjacent plate bodies in sequence, and securing the adjacent plate bodies to each other and connecting the adjacent plate bodies in a sealed manner, wherein the channel is formed at the channel portion by the adjacent plate bodies; and S3, after connection in the sealed manner, processing the mounting hole in the mounting portion of the plate bodies and/or processing the communication hole in the communication portion.

14. The communication device according to claim 1, wherein the communication device comprises five plate bodies, namely a first plate body, a second plate body, a third plate body, a fourth plate body and a fifth plate body, at least part of the second plate body is located between the first plate body and the third plate body, at least part of the fourth plate body is located between the third plate body and the fifth plate body;

the channel portion of the second plate body and the channel portion of the fourth plate body each is a through groove, the channel portion of the first plate body and the channel portion of the fifth plate body each is a sunken groove, the third plate body comprises two channel portions, both the two channel portions of the third plate body are sunken grooves, one of the sunken grooves of the third plate body is defined as a first sunken groove and the other of the sunken grooves of the third plate body is defined as a second sunken groove;

the channel comprises a first channel and a second channel, the first channel is formed by the sunken groove of the first plate body, the through groove of the second plate body and the first sunken groove of the third plate body, and the second channel is formed by the second sunken groove of the third plate body, the through groove of the fourth plate body and the sunken groove of the fifth plate body; and a joint surface of the second plate body with the first plate body and a joint surface of the second plate body with the third plate body each is coated with a composite welding layer, and a joint surface of the fourth plate body with the third plate body and a joint surface of the fourth plate body with the fifth plate body each is coated with a composite welding layer.

15. The communication device according to claim 14, wherein the mounting portion comprises a first mounting portion, the communication portion comprises a first communication portion, the first mounting portion and the first communication portion each is arranged in the axial direction of the communication device, the first mounting portion and the first communication portion each protrudes from the plate bodies located at two ends of the communication device; and the mounting hole comprises a first mounting hole, the first communication portion comprises a first communication hole, the first mounting hole and the first communication hole each is formed in the plate bodies in the axial direction and in communication with the channel; at least part of the valve device is inserted in the first mounting hole, and the inlet or the outlet of the at least one of the thermal management unit is in communication with the first communication hole; the valve device comprises at least one of a throttling element, an electromagnetic valve and a switching valve, and the thermal management unit comprises at least one of a heat exchange portion and a reservoir.

16. A thermal management assembly, comprising a communication device, a thermal management unit and a valve device, wherein the thermal management unit comprises at least one of a heat exchange portion and a reservoir, the valve device comprises at least one of a throttling element, an electromagnetic valve and a switching valve, the communication device comprises two or more plate bodies, adjacent plate bodies of the plate bodies are secured to each other and connected in a sealed manner, the communication device is provided with a channel, at least one channel portion is arranged inside at least one of the adjacent plate bodies, and the channel is formed at the channel portion by the adjacent plate bodies; wherein in an axial direction or a radial direction of the communication device, one of side walls of at least one of the plate bodies is provided with a mounting portion and/or a communication portion, the mounting portion is provided with a mounting hole, at least part of the valve device is arranged in the mounting hole, the communication portion is provided with a communication hole, and at least part of an inlet and an outlet of the thermal management unit is in communication with the communication hole.

17. A method for manufacturing the communication device according to claim 1, comprising:

S1, providing two or more blank plates, wherein in the axial direction or the radial direction of the communication device, one of side walls of at least one of the blank plates is provided with the mounting portion and/or the communication portion; and processing a channel portion in at least one of adjacent blank plates to obtain the plate body having the channel portion;

S2, stacking the adjacent plate bodies in sequence, and securing the adjacent plate bodies to each other and connecting the adjacent plate bodies in a sealed manner, wherein the channel is formed at the channel portion by the adjacent plate bodies; and S3, after connection in the sealed manner, processing the mounting hole in the mounting portion of the plate bodies and/or processing the communication hole in the communication portion.

18. The method according to claim 17, wherein the adjacent plate bodies are secured by welding, and before the welding, at least one of the adjacent plate bodies is coated with a composite welding layer on a joint surface, or a solder layer is arranged between the adjacent plate bodies, or a third plate sheet with composite welding layers coated on both sides is arranged between the adjacent plate bodies.

* * * * *